United States Patent
Keller et al.

(10) Patent No.: US 9,003,342 B1
(45) Date of Patent: Apr. 7, 2015

(54) LUMPED AGGRESSOR MODEL FOR SIGNAL INTEGRITY TIMING ANALYSIS

(71) Applicant: Cadence Design Systems, Inc., San Jose, CA (US)

(72) Inventors: Igor Keller, Pleasanton, CA (US); Jijun Chen, San Jose, CA (US); Dhananjay Griyage, Sunnyvale, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 14/230,931

(22) Filed: Mar. 31, 2014

(51) Int. Cl.
*G06F 17/50* (2006.01)

(52) U.S. Cl.
CPC .................. *G06F 17/5031* (2013.01)

(58) Field of Classification Search
CPC .......... G06F 17/50; G06F 15/04; G06F 9/455
USPC ......................................................... 716/108
See application file for complete search history.

(56) References Cited

U.S. PATENT DOCUMENTS 6,405,348 B1 * 6/2002 Fallah-Tehrani et al. ..... 716/113
7,562,323 B1 7/2009 Bai et al.

* cited by examiner

*Primary Examiner* — Thuan Do
(74) *Attorney, Agent, or Firm* — Kenyon & Kenyon LLP (57) ABSTRACT

A lumped aggressor model is used to simulate multiple aggressor nets acting on a victim net. By lumping the aggressor nets together into a single input port, a single voltage excitation may be applied to the input port to simulate the model during static timing analysis. However, a record of each individual aggressor net and several associated attributes for each aggressor net is maintained such that the individual lumped aggressor nets may still be modeled as separate contributions to the attack on the victim net.

18 Claims, 7 Drawing Sheets

LUMPED AGGRESSOR MODEL FOR SIGNAL INTEGRITY TIMING ANALYSIS

BACKGROUND

Aspects of the present invention relate generally to the field of circuit design and test, and more specifically to static timing analysis and simulation of electronics.

Integrated circuit (IC) design is increasingly complex, sometimes involving millions of elements, shapes or geometries, and may be facilitated with an electronic design automation (EDA) tool that allows a designer to interactively position ("place") and connect ("route") various shapes on the circuit. The EDA tool then creates a circuit layout containing the physical locations and dimensions of the circuit's components, interconnections, and various layers from the original design that may then be fabricated, creating the IC. The designed IC is eventually fabricated by transferring or printing the circuit layout to a semiconductor substrate in a series of layers that collectively will form the features that constitute the elements and devices that make up the components of the integrated circuit.

After or during the design and creation of an IC layout, validation, optimization, and verification operations are often performed on the IC layout using a set of testing, simulation, analysis and validation tools. These operations are conventionally performed in part to detect and correct placement, connectivity, and timing errors. For example, as part of the verification, the IC layout may undergo circuit simulation and analysis where the signals between components are analyzed and tested, for example using static timing analysis (STA) or gate level simulation (GLS). STA is used to model the expected timing of a digital circuit by estimating the expected delay within the circuit, via the anticipated worst case signal path for example, without requiring a lengthy and cost prohibitive full simulation of the circuit.

In order to identify the timing of a path through the circuit, a timing model for various circuit stages may be created. Such models typically include an estimate of the effects of multiple neighboring nets (aka aggressor nets) on the modeled net (aka victim net). However, in complex circuit designs having small, densely packed elements, the number of neighboring nets that may interfere with the victim net is often very large. To effectively model such designs, conventionally either the effect of each individual aggressor net is modeled, which is often very costly, or the effect of multiple aggressor nets are estimated together as a single aggressor, which is quicker but less accurate.

Accordingly, there is a need in the art to efficiently develop aggressor models for complex designs while maintaining accurate timing results.

BRIEF DESCRIPTION OF THE DRAWINGS

The foregoing and other aspects of various embodiments of the present invention will be apparent through examination of the following detailed description thereof in conjunction with the accompanying drawing figures in which similar reference numbers are used to indicate functionally similar elements.

DETAILED DESCRIPTION

Using a lumped aggressor model of the aggressors acting on a victim net provides a new efficient and accurate method for modeling aggressors in a circuit design. By lumping the aggressors together into a single input port, a single voltage excitation may be applied to the input port to simulate the model during static timing analysis. However, a record of each individual aggressor net in the lumped aggressor is maintained such that the individual lumped aggressor nets may still be modeled as separate contributions to the attack on the victim net as needed to produce accurate results. Therefore, the lumped aggressor may provide an accurate timing analysis while expediting the development of the aggressor models.

Figure 1:
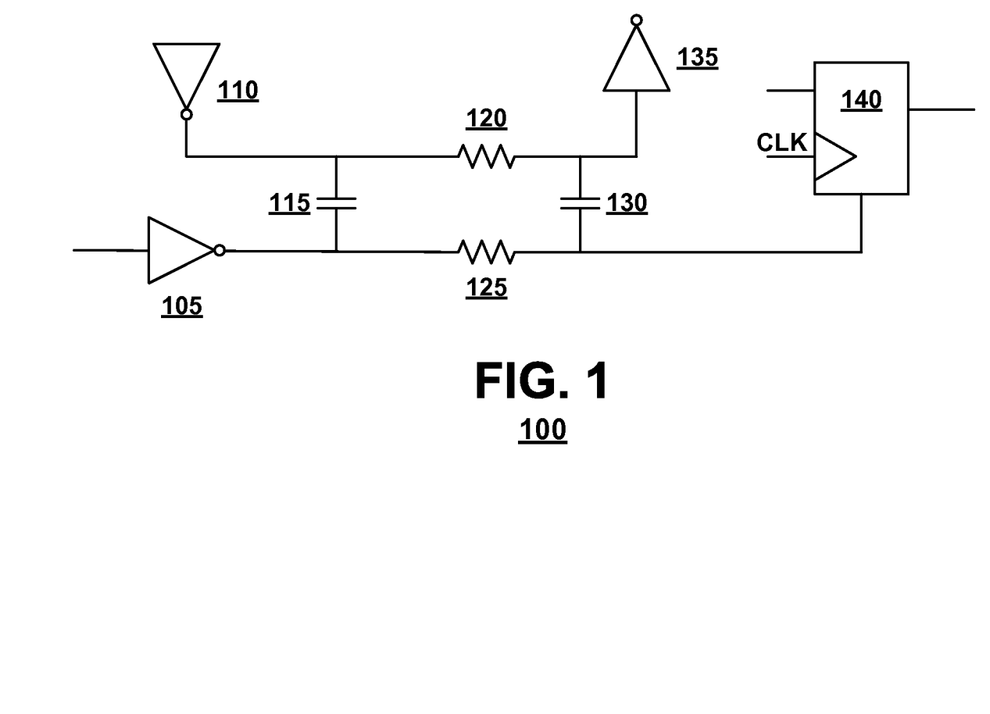
FIG. 1 illustrates an exemplary portion of a circuit design to be analyzed according to an embodiment of the present invention.

As previously noted, static timing analysis (STA) is a method used to assess the timing of a digital circuit using software techniques and certain models that provide relevant characteristics of the digital circuit. To accurately estimate the timing of certain nets, the effects of interference from neighboring nets may be estimated. FIG. 1 illustrates an exemplary portion of a circuit design 100 to be analyzed according to an embodiment of the present invention. To analyze the timing path of the illustrated design portion 100, the timing of each element may be evaluated. For example, analyzing the timing of element 105 will include determining the delay for a signal travelling through the element 105. However, the neighboring elements, e.g. 110 and 135, may create interference that affects the timing of the element 105. For example, if element 105 (sometimes called the victim net) is quiet, the neighboring elements (sometimes called the attacker nets or aggressor nets) can affect the value of the signal in the element. Alternatively, if element 105 is in the process of switching, the interference from the aggressor nets could alter the speed of the switch, creating a signal integrity delay problem. Accordingly, to accurately estimate the delay at the element 105, the effect of the aggressor nets also needs to be anticipated.

Figure 2:
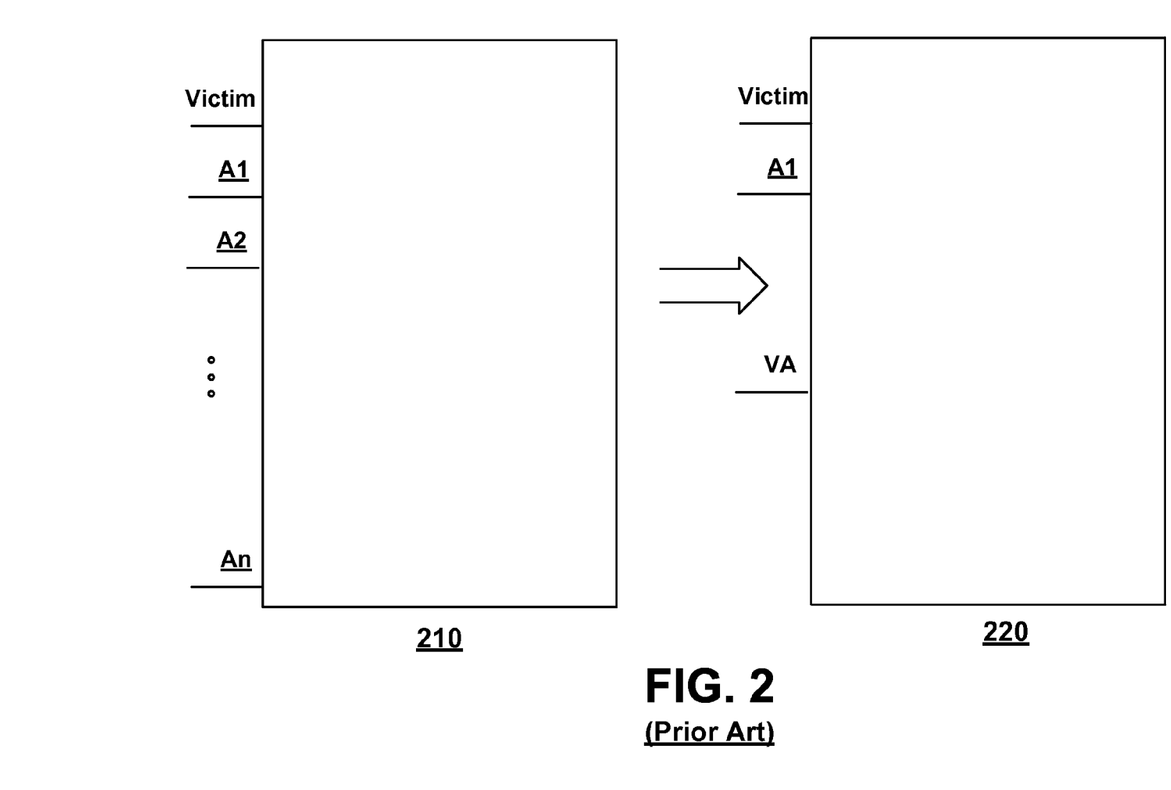
FIG. 2 illustrates conventional models of a portion of a circuit design for analysis.

FIG. 2 illustrates conventional models of a portion of a circuit design for analysis. As shown in FIG. 2, a design may be modeled such that the victim net and each aggressor net is assigned to an input port on the model 210, and an output predicting the effect of each aggressor net on the victim net can then be determined. However, determining the effect of each individual aggressor is time consuming. The runtime of the STA using such a model will be a function of the number of modeled aggressor nets. One method of expediting the evaluation is to merge multiple aggressor nets into a single virtual aggressor on the model 220. However, mathematically reducing the aggressor nets into a single virtual aggressor is substantially less accurate than separately modeling the effect of each aggressor. As circuit fabrication technologies get smaller, accurately predicting the effects of even small aggressors becomes more important.

Figure 3:
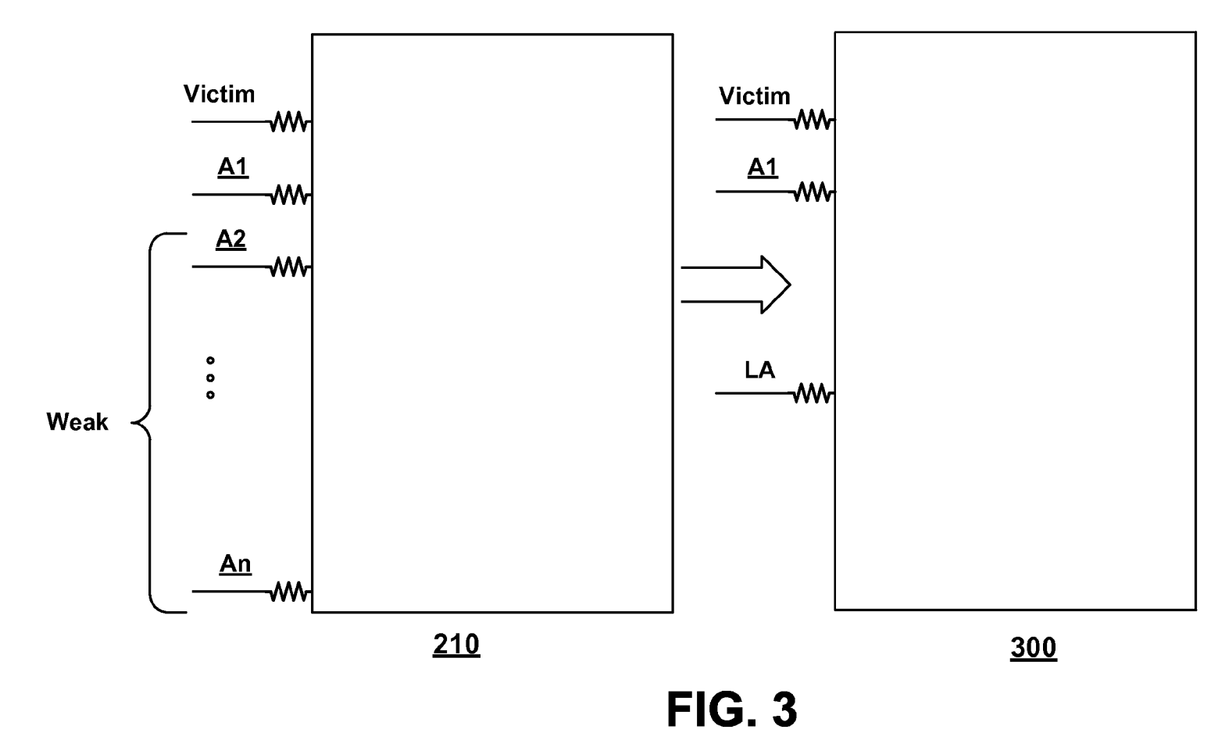
FIG. 3 illustrates an exemplary lumped aggressor model of a portion of a circuit design for analysis according to an embodiment of the present invention.

In order to accurately and expeditiously estimate all aggressors acting on a victim, a lumped aggressor model may be formed. FIG. 3 illustrates an exemplary lumped aggressor model of a portion of a circuit design for analysis according to an embodiment of the present invention. As shown in FIG. 3, an aggressor model 300 will include a separate input port for the victim and the larger aggressors above a predetermined strength (e.g. A1). Then the weak aggressors below the predetermined strength threshold may be lumped together electronically at a single input port such that during analysis, voltage excitation may be applied only to the single port (LA). However, to maintain accuracy, the contribution of each smaller aggressor in the lumped aggressor LA may be modeled individually.

Each weak aggressor that is a component of the lumped aggressor LA is treated individually at the logical level. For example, each weak aggressor has a known logical net, known connectivity to driving and receiving instances, and its own timing windows and transitions. However, the weak aggressors are lumped at the electrical level such that in the model, each weak aggressor is electrically connected to a node shared by all the weak aggressors.

While keeping the weak aggressors lumped to the same electrical port, each weak aggressor may be treated as an individual aggressor, such that a glitch is simulated individually for each weak aggressor using a driver waveform associated with the individual weak aggressor. Therefore although the smaller aggressors are modeled together as a single input, the individual contribution of each aggressor is preserved as part of the model. This preservation additionally allows the model to process electrical filtering for each aggressor when applicable and to constrain each aggressor dynamically during aligner iterations using the timing window associated with each aggressor net.

The threshold for identifying smaller aggressors to be lumped together may be a predetermined threshold set by the circuit designer, or may be set within the EDA tool. The threshold may additionally be manually adjustable, thereby allowing the designer to decrease the threshold and allow more aggressors to be modeled on individual input pins to increase accuracy of the model or to increase the threshold and cause more aggressors to be modeled with the lumped aggressor to improve the runtime of the analysis.

Figure 4:
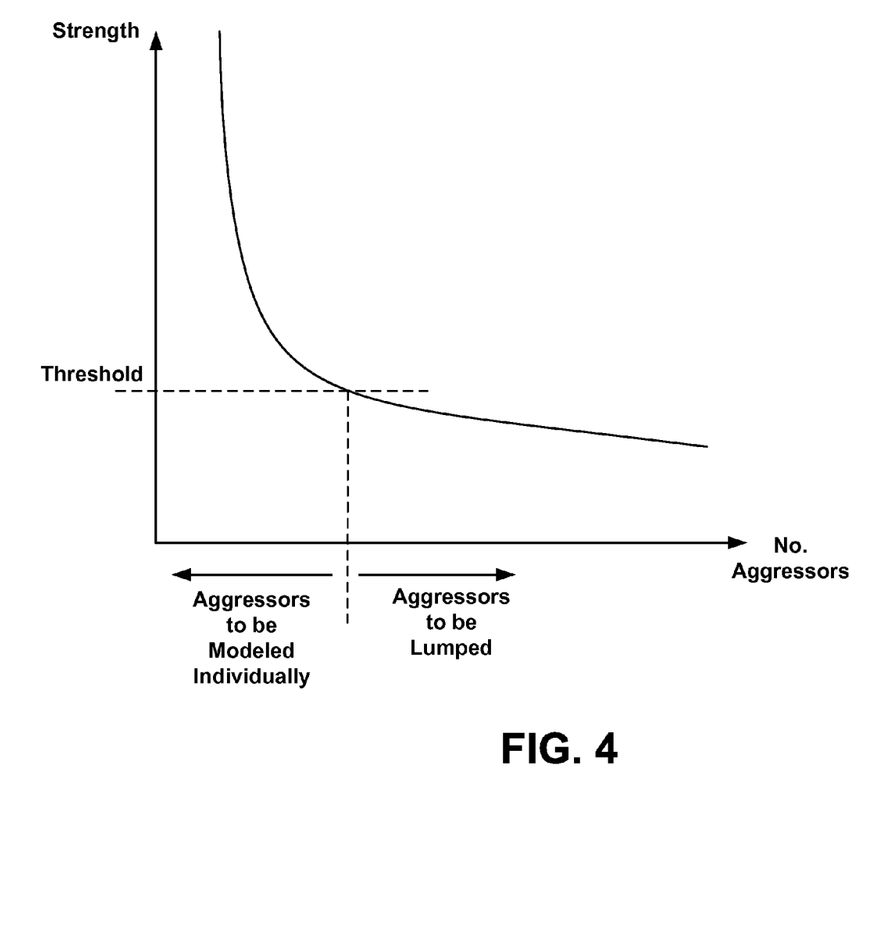
FIG. 4 is a graph that illustrates the aggressors affecting a single victim.

FIG. 4 is a graph that illustrates the aggressors affecting a single victim. As shown, there will usually be a small number of aggressors, having a strength above the predetermined threshold, which will be modeled separately from the lumped aggressor.

A method for identifying the aggressors to be combined in a lumped aggressor includes estimating the glitch created by each aggressor and selecting the aggressors below a glitch threshold. For example, the effective coupling capacitance based on the cross capacitance distribution for the circuit may be calculated to identify all of the aggressors to be included in the model of the victim net. Then the glitch created by each aggressor may be estimated in accordance with Equation 1.

$$\text{Glitch\_height} = \frac{C_c * R_{hold}}{AggSlew} * \left(1 - e^{\frac{-AggSlew}{R_{hold}*C_{total}}}\right) \quad \text{EQ. 1}$$

Where $C_c$ is the coupling capacitance between the aggressor and victim nets; $R_{hold}$ is the holding resistance model extracted from victim's driver electrical model; $C_{total}$ is the total capacitance on the victim net including ground capacitance of the wire, the coupling capacitance to all aggressors, and the pin capacitance of connected instances; and AggSlew is the fastest slew on the aggressor net. $R_{hold}$ may be computed using an available timing or noise model of the driving cell. Such a model may be available in existing libraries.

If the estimated glitch for an aggressor is above a predetermined threshold, the aggressor may be modeled as an independent aggressor having its own input pin. However, for aggressors creating an estimated glitch below the threshold, those aggressors may be combined in a lumped aggressor model.

Usage of lumped aggressor in analysis is similar to usage of stand-alone aggressors. Each lumped aggressor component is modeled as a separate net for logical and timing filtering of aggressors. These components are shifted and aligned according to a chosen alignment algorithm corresponding to a particular methodology of analyzing signal integrity.

Although described primarily with reference to a single lumped aggressor, multiple lumped aggressors may be used in the timing analysis of a victim net. Small aggressors may be grouped in more than just one group and each group may be connected to an electrical node. Each such group of small aggressors will represent a lumped aggressor whose components share the same electrical node, but are treated as separate logical nets in different parts of the delay calculation flow.

Figure 5:
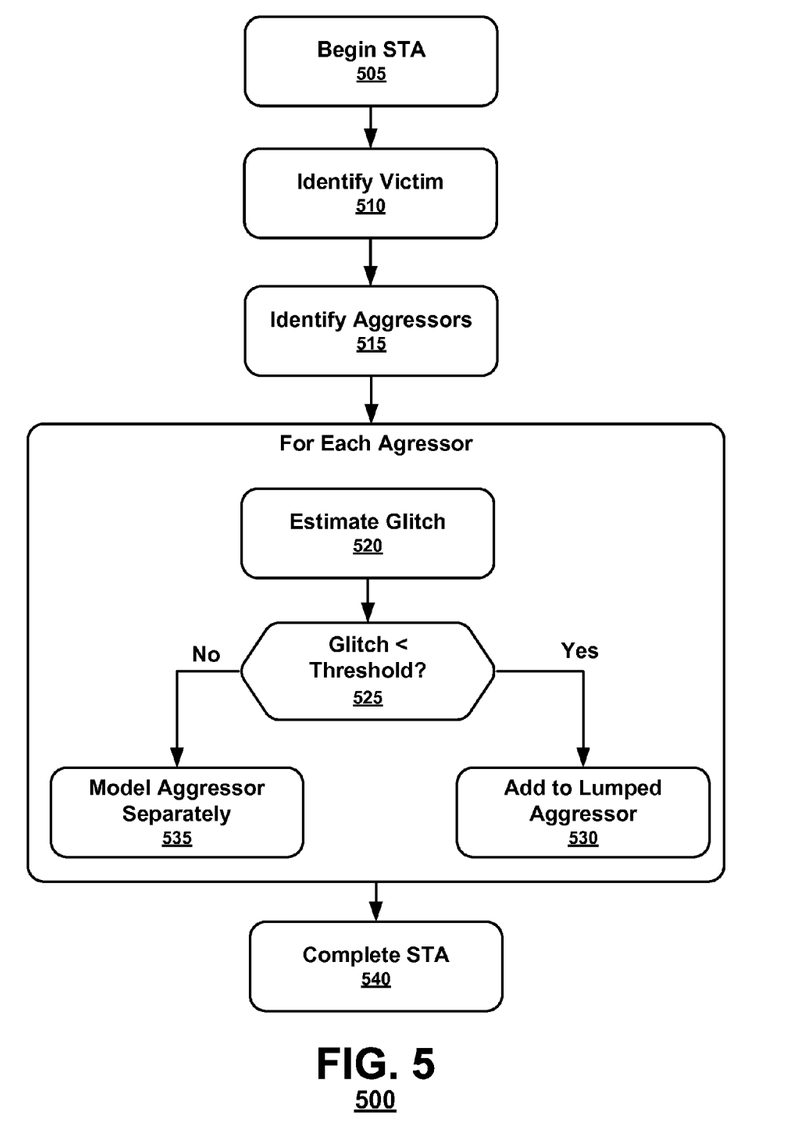
FIG. 5 illustrates an exemplary method for static timing analysis using a lumped aggressor according to an embodiment of the present invention.

FIG. 5 illustrates an exemplary method 500 for STA using a lumped aggressor according to an embodiment of the present invention. As shown in FIG. 5, during STA for a circuit design (block 505), a potential victim net to be modeled is identified (block 510). Then, to model the timing for the victim net, the aggressor nets affecting the victim may be identified (block 515). For each identified aggressor, the glitch created by the aggressor may then be estimated (block 520). If the estimated glitch is below a predetermined threshold (block 525), the respective aggressor is included as part of the lumped aggressor (block 530). If the estimated glitch is above a predetermined threshold (block 525), the respective aggressor is not included as part of the lumped aggressor but rather is modeled separately (block 535). Then, using the created lumped aggressor model, the affect of the aggressors on the victim is anticipated and the STA completed (block 540).

Figure 6:
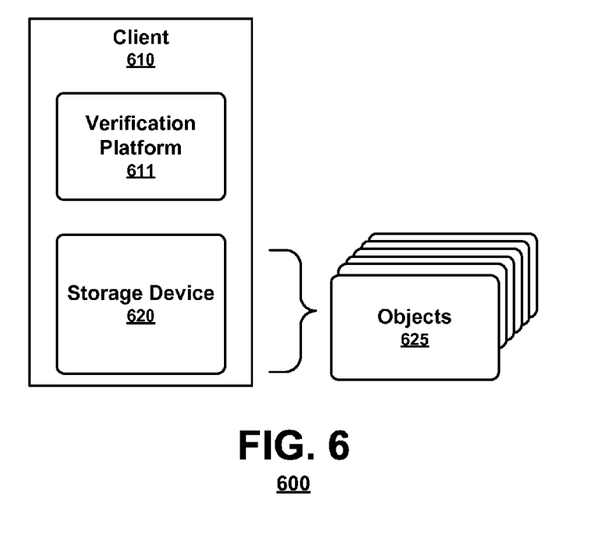
FIG. 6 is a simple block diagram illustrating components of an exemplary system according to an embodiment of the present invention.

A user or designer may access a simulator interface to model and analyze a design in a standalone client system, client-server environment, or a networked environment. FIG. 6 is a simple block diagram illustrating components of an exemplary system 600 according to an embodiment. As shown in FIG. 6, a system 600 may comprise a client 610 executing a simulator 611 and having a memory storage 620. The client 610 may be any computing system that executes a simulator 611 or otherwise facilitates access to memory storage 620, for example a personal computer. The client 610 may include a processor that performs a method in accordance with the disclosed embodiments. Such a client would be part of an overall simulation system in accordance with the disclosed embodiments.

Hardware models, instruction sets, software packages, instances of the modeled components, state information for the modeled components, timing files, netlists and other objects 625 used by the simulator 611 may be stored in memory storage 620. A user may access the objects 625 stored in memory storage 620 with the client 610 via the simulator 611, where the simulator 611 is capable of accessing memory storage 620 and displaying the objects 625 and the data associated with the simulation. The simulator 611 may include a user interface, for example a program, application or middleware that acts as a frontend to and facilitates access to objects in memory storage 620. The simulator 611 may facilitate executing a gate level simulation with smart timing models using the tools and procedures described herein. The user may interact with the simulator 611 through a number of input devices, such as by inputting a selection as with a mouse or inputting a request as with a keyboard. The user may observe the simulation results on an output device or display. The simulator 611 may run in an application window controlled by the user.

As shown in FIG. 6, a client 610 may be a stand-alone system, as may be of particular interest where the components being simulated are highly confidential. Additionally, according to an aspect of an embodiment as shown in FIG. 7, a client 710 may be part of a networked environment.

Figure 7:
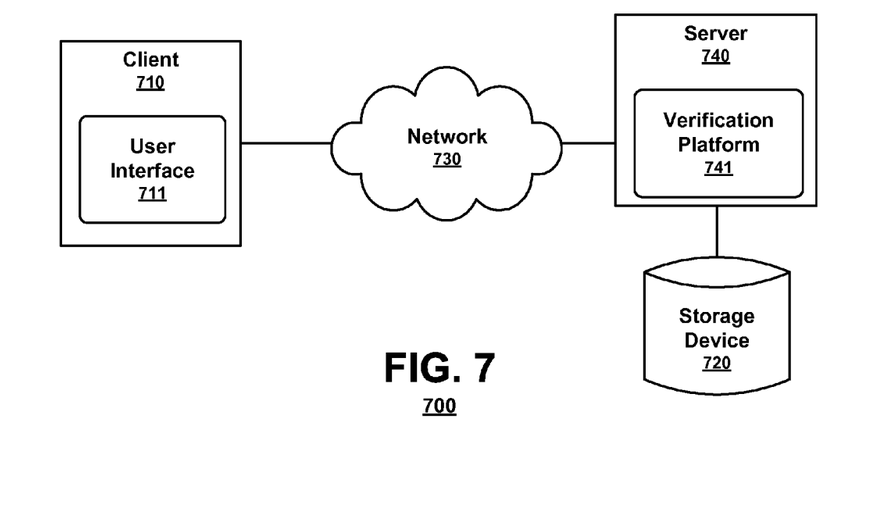
FIG. 7 is a simple block diagram illustrating components of an exemplary system according to an embodiment of the present invention.

FIG. 7 is a simple block diagram illustrating components of an exemplary system 700 according to an embodiment. As shown in FIG. 7, system 700 may include a client 710 having a user interface 711. The client 710 may be connected to a server 740 via a network 730. The simulator 741, which in this embodiment is located at server 740, may have access to storage device 720 storing hardware models, instruction sets, software packages, instances of the modeled components, state information for the modeled components, timing files, netlists and other objects utilized by the simulator 741. The server 740 may include a processor that performs a method in accordance with the disclosed embodiments. Such a server then would be part of an overall simulation system in accordance with the disclosed embodiments.

A user may access a simulator 741 at the server 740 via the client 710 having a user interface 711 capable of accessing and displaying the components implemented as part of a virtual platform and the results of the simulation of those components. The client 710 may be any computing system that facilitates the user accessing storage device 720, for example a personal computer. The network 730 may be a wired or wireless network that may include a local area network (LAN), a wireless area network (WAN), the Internet, or any other network available for accessing storage device 720 from the client 710.

The server 740 may be a network server accessible to the client 710 via the network 730 that may manage access to storage device 720. The user interface 711 may receive instructions regarding a simulation from the user and utilizing the objects stored in memory storage 720, facilitate a display of the simulation or the information gathered during the simulation. Multiple different clients (not shown) may access storage device 720 via the network 730 and request access to the objects stored therein.

In another networked environment, the simulator may be executed on a network capable client and access the models, packages and other objects stored in one or more storage devices via a network and communications server.

Figure 8:
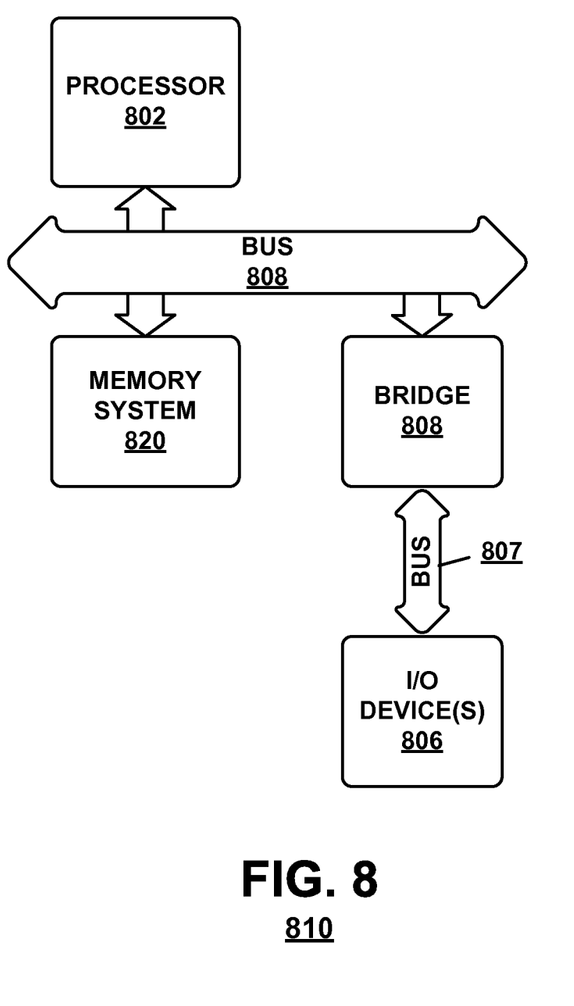
FIG. 8 is a simple block diagram illustrating components of an exemplary client according to an embodiment of the present invention.

FIG. 8 is a simple block diagram illustrating components of an exemplary client 810 according to an embodiment of the present invention. As shown in FIG. 8, the client 810 configured to execute the simulator as described herein may include a processor 802, a memory system 820 and one or more input/output (I/O) devices 806 in communication. The communication can be implemented in a variety of ways and may include one or more computer buses 806, 807 and/or bridge devices 808 as shown in FIG. 8. The I/O devices 806 can include network adapters and/or mass storage devices from which the client 810 can receive commands for executing the simulation.

As shown in FIG. 6, a client 810 may be a stand-alone system, as may be of particular interest where the components being simulated are highly confidential. Additionally, according to an aspect of an embodiment as shown in FIG. 7, a client 810 may be part of a networked environment.

In some applications, the modules described hereinabove may be provided as elements of an integrated software system, in which the blocks may be provided as separate elements of a computer program. Some embodiments may be implemented, for example, using a non-transitory computer-readable storage medium or article which may store an instruction or a set of instructions that, if executed by a processor, may cause the processor to perform a method in accordance with the embodiments. Other applications of the present invention may be embodied as a hybrid system of dedicated hardware and software components. Moreover, not all of the modules described herein need be provided or need be provided as separate units. Additionally, it is noted that the arrangement of the blocks in FIG. 5 do not necessarily imply a particular order or sequence of events, nor are they intended to exclude other possibilities. For example, the operations depicted at blocks 530 and 535 may occur substantially simultaneously with each other. Such implementation details are immaterial to the operation of the present invention unless otherwise noted above.

The exemplary methods and computer program instructions may be embodied on a non-transitory computer readable storage medium that may include any medium that can store information. Examples of a computer readable storage medium include electronic circuits, semiconductor memory devices, ROM, flash memory, erasable ROM (EROM), floppy diskette, CD-ROM, optical disk, hard disk, fiber optic medium, or any electromagnetic or optical storage device. In addition, a server or database server may include computer readable media configured to store executable program instructions. The features of the embodiments of the present invention may be implemented in hardware, software, firmware, or a combination thereof and utilized in systems, subsystems, components or subcomponents thereof.

While the invention has been described in detail above with reference to some embodiments, variations within the scope and spirit of the invention will be apparent to those of ordinary skill in the art. Thus, the invention should be considered as limited only by the scope of the appended claims.

We claim:

1. A system for analyzing the timing of a circuit design, the system comprising:
 a memory to store the design including instances of a plurality of nets;
 a processor configured to:
  identify a victim net in the plurality of nets,
  identify a plurality of aggressor nets for the victim in the plurality of nets,
  for each aggressor net in the plurality of identified aggressor nets:
   estimate a glitch created by the aggressor net,
   for an aggressor net having a glitch below a predetermined threshold, add the aggressor net to a lumped aggressor model such that each aggressor net in the lumped aggressor model is electrically connected to a shared node;
   for an aggressor net having a glitch above a predetermined threshold, model the aggressor net separately; and
  simulate the victim net, with reference to the lumped aggressor model or the separately modeled aggressor nets, to estimate the timing for the victim net;

wherein during simulation, for each aggressor net in the lumped aggressor model, the glitch for each aggressor is simulated individually using an associated driver waveform.

2. The system of claim 1, wherein to simulate the lumped aggressor model, the processor is configured to apply a single voltage excitation to the single port of the lumped aggressor model.

3. The system of claim 1, wherein to add the aggressor net to the lumped aggressor model, the processor is further configured to maintain an association with a logical net, connectivity information to driving and receiving instances, and a timing window for each instance of an aggressor net in the lumped aggressor model.

4. The system of claim 1, wherein to simulate the lumped aggressor model, the processor is further configured to process electrical filtering for an individual aggressor net in the lumped aggressor model.

5. The system of claim 1, wherein the glitch created by an aggressor net is calculated as:

$$\text{Glitch\_height} = \frac{C_c * R_{hold}}{AggSlew} * \left(1 - e^{\frac{-AggSlew}{R_{hold} * C_{total}}}\right)$$

wherein $C_c$ is a coupling capacitance between the aggressor net and the victim net, $R_{hold}$ is a holding resistance model extracted from a driver electrical model associated with the victim net, $C_{total}$ is a total capacitance on the victim net, and AggSlew is a fastest slew on the aggressor net.

6. The system of claim 1, wherein to simulate the lumped aggressor model, the processor is further configured to dynamically constrain an individual aggressor net in the lumped aggressor model using a timing window associated with the aggressor net.

7. A method for analyzing timing of a circuit design, the method comprising:
   identifying a victim net in the design;
   identifying a plurality of aggressor nets for the victim;
   using a processor, for each aggressor net in the plurality of identified aggressor nets:
      estimating a glitch created by the aggressor net,
      for an aggressor net having a glitch below a predetermined threshold, adding the aggressor net to a lumped aggressor model such that each aggressor net in the lumped aggressor model is electrically connected to a shared node;
      for an aggressor net having a glitch above a predetermined threshold, modeling the aggressor net separately; and
   using a processor, simulating the victim net, with reference to the lumped aggressor model or the separately modeled aggressor nets, to estimate the timing for the victim net;
   wherein during simulation, for each aggressor net in the lumped aggressor model, the glitch for each aggressor is simulated individually using an associated driver waveform.

8. The method of claim 7, wherein simulating the lumped aggressor model comprises applying a single voltage excitation to the single port of the lumped aggressor model.

9. The method of claim 7, wherein adding the aggressor net to the lumped aggressor model includes maintaining an association with a logical net, connectivity information to driving and receiving instances, and a timing window with the aggressor net.

10. The method of claim 7, wherein simulating the lumped aggressor model comprises processing electrical filtering for an individual aggressor net in the lumped aggressor model.

11. The method of claim 7, wherein the glitch created by an aggressor net is calculated as:

$$\text{Glitch\_height} = \frac{C_c * R_{hold}}{AggSlew} * \left(1 - e^{\frac{-AggSlew}{R_{hold} * C_{total}}}\right)$$

wherein $C_c$ is a coupling capacitance between the aggressor net and the victim net, $R_{hold}$ is a holding resistance model extracted from a driver electrical model associated with the victim net, $C_{total}$ is a total capacitance on the victim net, and AggSlew is a fastest slew on the aggressor net.

12. The method of claim 7, wherein simulating the lumped aggressor model comprises dynamically constraining an individual aggressor net in the lumped aggressor model using a timing window associated with the aggressor net.

13. A non-transitory computer readable medium storing instructions that when executed by a processor perform a method for analyzing timing of a circuit design, the method comprising:
   identifying a victim net in the design;
   identifying a plurality of aggressor nets for the victim;
   using a processor, for each aggressor net in the plurality of identified aggressor nets:
      estimating a glitch created by the aggressor net,
      for an aggressor net having a glitch below a predetermined threshold, adding the aggressor net to a lumped aggressor model such that each aggressor net in the lumped aggressor model is electrically connected to a shared node;
      for an aggressor net having a glitch above a predetermined threshold, modeling the aggressor net separately; and
   using a processor, simulating the victim net, with reference to the lumped aggressor model or the separately modeled aggressor nets, to estimate the timing for the victim net;
   wherein during simulation, for each aggressor net in the lumped aggressor model, the glitch for each aggressor is simulated individually using an associated driver waveform.

14. The computer readable medium of claim 13, wherein simulating the lumped aggressor model comprises applying a single voltage excitation to the single port of the lumped aggressor model.

15. The computer readable medium of claim 13, wherein adding the aggressor net to the lumped aggressor model includes maintaining an association with a logical net, connectivity information to driving and receiving instances, and a timing window with the aggressor net.

16. The computer readable medium of claim 13, wherein simulating the lumped aggressor model comprises processing electrical filtering for an individual aggressor net in the lumped aggressor model.

17. The computer readable medium of claim 13, wherein the glitch created by an aggressor net is calculated as:

$$\text{Glitch\_height} = \frac{C_c * R_{hold}}{AggSlew} * \left(1 - e^{\frac{-AggSlew}{R_{hold} * C_{total}}}\right)$$

wherein $C_c$ is a coupling capacitance between the aggressor net and the victim net, $R_{hold}$ is a holding resistance model extracted from a driver electrical model associated with the victim net, $C_{total}$ is a total capacitance on the victim net, and AggSlew is a fastest slew on the aggressor net.

18. The computer readable medium of claim 13, wherein simulating the lumped aggressor model comprises dynamically constraining an individual aggressor net in the lumped aggressor model using a timing window associated with the aggressor net.

* * * * *